United States Patent
Suzuki et al.

(10) Patent No.: US 6,708,667 B2
(45) Date of Patent: Mar. 23, 2004

(54) COMBUSTION CHAMBER STRUCTURE OF IN-CYLINDER FUEL INJECTION TYPE ENGINE

(75) Inventors: Yuchi Suzuki, Iwata (JP); Shinichi Kurosawa, Iwata (JP); Yuji Kinoshita, Iwata (JP)

(73) Assignee: Yamaha Hatsudoki Kaibushiki Kaisha, Iwata (JP)

( * ) Notice: Subject to any disclaimer, the term of this patent is extended or adjusted under 35 U.S.C. 154(b) by 0 days.

(21) Appl. No.: 09/799,371

(22) Filed: Mar. 5, 2001

(65) Prior Publication Data

US 2001/0018904 A1 Sep. 6, 2001

(30) Foreign Application Priority Data

Mar. 6, 2000 (JP) ......................................... 2000-061284

(51) Int. Cl.$^7$ ................................................. F02B 19/08
(52) U.S. Cl. .................... 123/262; 123/301; 123/302; 123/305
(58) Field of Search ................................. 123/262, 301, 123/302, 305

(56) References Cited

U.S. PATENT DOCUMENTS

| | | | | | |
|---|---|---|---|---|---|
| 5,425,337 A | * | 6/1995 | Matsuoka | ................... | 123/262 |
| 5,711,269 A | * | 1/1998 | Oda et al. | ................... | 123/262 |
| 5,819,700 A | * | 10/1998 | Ueda et al. | ................... | 123/262 |
| 6,006,719 A | * | 12/1999 | Matsumura | ................... | 123/302 |
| 6,152,103 A | * | 11/2000 | Kudo et al. | ................... | 123/298 |
| 6,173,690 B1 | * | 1/2001 | Iriya et al. | ................... | 123/295 |

FOREIGN PATENT DOCUMENTS

| | | |
|---|---|---|
| DE | 19816743 | 10/1998 |
| DE | 19920735 | 11/1999 |
| DE | 19923251 | 11/1999 |
| EP | 0839997 | 5/1998 |
| FR | 2778432 | 11/1999 |

OTHER PUBLICATIONS

European Search Report dated Feb. 7, 2002.

* cited by examiner

*Primary Examiner*—Hieu T. Vo
*Assistant Examiner*—Johnny H. Hoang
(74) *Attorney, Agent, or Firm*—Ernest A Beutler

(57) ABSTRACT

A combustion chamber arrangement for a direct fuel injected internal combustion engine wherein the combustion chamber is formed in part by a recess in the piston head. Fuel is injected into the combustion chamber so as to be introduced on one side of the recess with a spark plug being positioned so that its gap lies diametrically opposite the fuel injector. An arrangement is provided for introducing a swirl to the flow of fuel and the combustion chamber recess is canted so that its lower surface is deeper where the fuel first enters then on the other side so as to improve flame propagation and complete combustion while maintaining a high compression ratio.

13 Claims, 4 Drawing Sheets

US 6,708,667 B2

COMBUSTION CHAMBER STRUCTURE OF IN-CYLINDER FUEL INJECTION TYPE ENGINE

BACKGROUND OF INVENTION

This invention relates to a four cycle internal combustion engine of the direct injected spark ignited type and more particularly to an improved combustion chamber construction for such an engine.

In the interest of further improving the efficiency and performance of internal combustion engines, direct cylinder injection is increasingly being resorted to. By utilizing direct cylinder injection it is possible to obtain stratification of the mixture at loads less than full load. That can improve not only performance but also fuel efficiency and exhaust emission control. However, in attempting to inject the fuel directly into a open chamber and achieve stratification, it is necessary to insure some way in which a stoichiometric fuel/air mixture is presented at the spark gap at the time the spark plug is fired. Various arrangements have been proposed to achieve this result.

In accordance with one type of methodology, the combustion chamber is formed in part by a recess or bowl formed in the head of piston. The fuel is injected toward this bowl and the induction air is directed so as to cause the fuel to be swept along the surface of the bowl and redirected thereby toward the gap of the spark plug so as to insure that a stoichiometric mixture is present at the time when the spark plug is fired.

Also, in order to insure complete combustion, particularly under high speed high load conditions when a homogenous mixture is provided in the combustion chamber, it is desirable to position the spark plug close to or at the center of the combustion chamber. This means that the bowl or recess must be configured so as to direct the fuel toward the spark plug even under low speed low load conditions.

One structure that has been proposed for this purpose is shown in published Japanese Application Hei 9-144544, published Jun. 3, 1997. This typifies the type of prior art which has been proposed to achieve this result.

The difficulty with this prior art type of construction, however, is that in order to achieve the desired stratification under low speed low load conditions, the bowl in the piston head has had a fairly substantial volume. This means that the compression ratio of the engine is severely limited. This in turn, dictates less then optimal performance.

It is, therefore, a principal object to this invention to provide a combustion chamber configuration wherein direct cylinder fuel injection is possible and wherein the piston head recess is made as small as possible while still achieving the desired results of stratification.

It is a further object to this invention to provide an improved combustion chamber configuration for a direct injection engine having a high compression ratio, a central spark plug position and a bowl in the head of the piston that permits the fuel to be directed toward the gap of the spark plug without significantly adding to the clearance volume of the engine and thus maintaining a high compression ratio.

SUMMARY OF INVENTION

This invention is adapted to be embodied in an internal combustion engine and more particularly to a combustion chamber therefore. The combustion chamber is defined by a cylinder bore, a cylinder head that closes one end of the cylinder bore and a piston that reciprocates in the cylinder bore. A head of the piston has a generally circular recess formed therein when viewed toward the direction of the axis of the cylinder bore. A fuel injector injects fuel directly into the combustion chamber. An arrangement is provided for causing the fuel flowing from the fuel injector to pass in a circular swirling direction around the axis of the cylinder bore and within the piston head recess. A spark plug is disposed on a side of the piston head recess that is diametrically opposed to the point where the fuel injector injects fuel into the combustion chamber. The piston head recess has a greater depth from a lower surface thereof to the facing surface of the cylinder head on one side of a diametric line extending between the fuel injector and the spark plug, then on the other side of the diametric line. The arrangement for effecting the flow of fuel in the circular swirling direction causes the fuel to flow first into the deeper side of the piston head recess.

DETAILED DESCRIPTION

Figure 1:
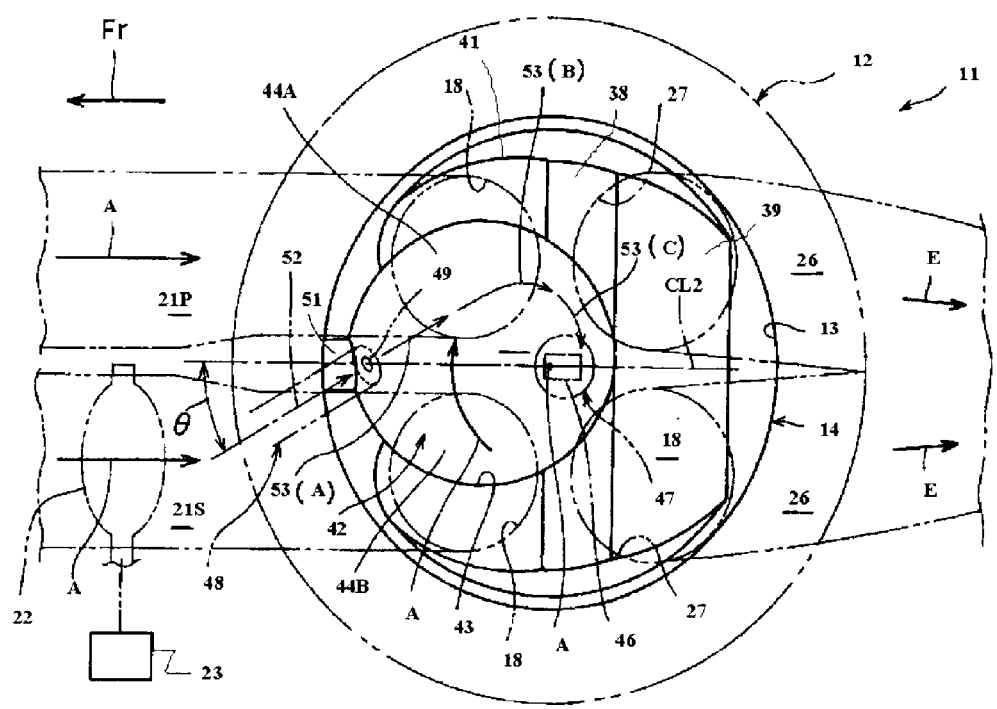
FIG. 1 is a top plan view of a piston and surrounding cylinder bore constructed in accordance with an embodiment of the invention and with certain components of the cylinder head and related induction and exhaust systems show in phantom.

Referring now in detail to the drawings and first to the embodiment of FIGS. 1–4, a multi-cylinder internal combustion engine is identified generally by the reference numeral 11. Since the invention deals primarily with the combustion chamber for the engine, only the upper portion of the engine is shown in the drawings and only one cylinder is depicted. It will be readily apparent to those skilled in the art how the invention can be utilized with engines having varying cylinder numbers and configurations.

The engine 11 is comprised of a cylinder block, indicated generally by the reference numeral 12 and which defines one or more cylinder bores 13 in which pistons, indicated generally by the reference numeral 14 reciprocate. The cylinder bore axis is indicated as A.

A connecting rod 15 is connected at its small end to the piston 14 via a piston pin 16. The lower end of the connecting rod 15 is journalled on a throw of a crankshaft, which is not shown for the afore noted reasons.

The upper end of the cylinder bore 13 is closed by a cylinder head assembly that is comprised of a main cylinder head member 17. This cylinder head member 17 has an recess 18 formed in its lower surface which closes the cylinder bore 13. This recess 18 cooperates with the head of the piston 14, which will be described in more detail later, to define a combustion chamber which is shown at its top dead center position in FIGS. 2–4, when the clearance volume is at the minimum. It will be seen that the cylinder head recess 18 is very shallow and the piston head is domed so as to maintain as high a compression ratio as possible.

In the illustrated embodiment, the engine 11 is of the four valve per cylinder type although the invention is not so limited. To this end, there are provided a pair of intake valve seats 18 that are valved by poppet type intake valves 19 in a well known manner. These intake seats 18 lie substantially on one side of a plane containing the cylinder bore axis A and extending perpendicularly to FIG. 2. A pair of intake passages 21-P and 21-S serve the valve seats 18.

A suitable induction system (now shown) is affixed to one side of the cylinder head member 17 for collecting intake air. This induction system may be of any suitable type and can include an air inlet silencer, plenum chamber and filter mechanism. In addition, a throttle valve arrangement is incorporated for controlling the total air flow to the engine 11. In addition to this, the induction system includes a main throttle valve arrangement for controlling the total air flow into the combustion chambers. The air flow direction is indicated by the arrows A.

In addition to this a main flow control throttle valve arrangement, each cylinder of the engine is provided with an individual flow controlling valve 22 is positioned in the secondary intake passage 21-S of each cylinder. This flow controlling valve controls the volume of air flow through the secondary intake passage 21-S and is controlled by a suitable mechanism, such as a servo motor 23 or linkage system that is interconnected with the main throttle valve so as to operate in a staged sequence. The control strategy for opening the flow control valve 22 is such that this valve is maintained in a closed a position under idle, low speed and low mid-range running performance and opens as the low and/or speed of the engine increases. The purpose for this will described later.

Figure 2:
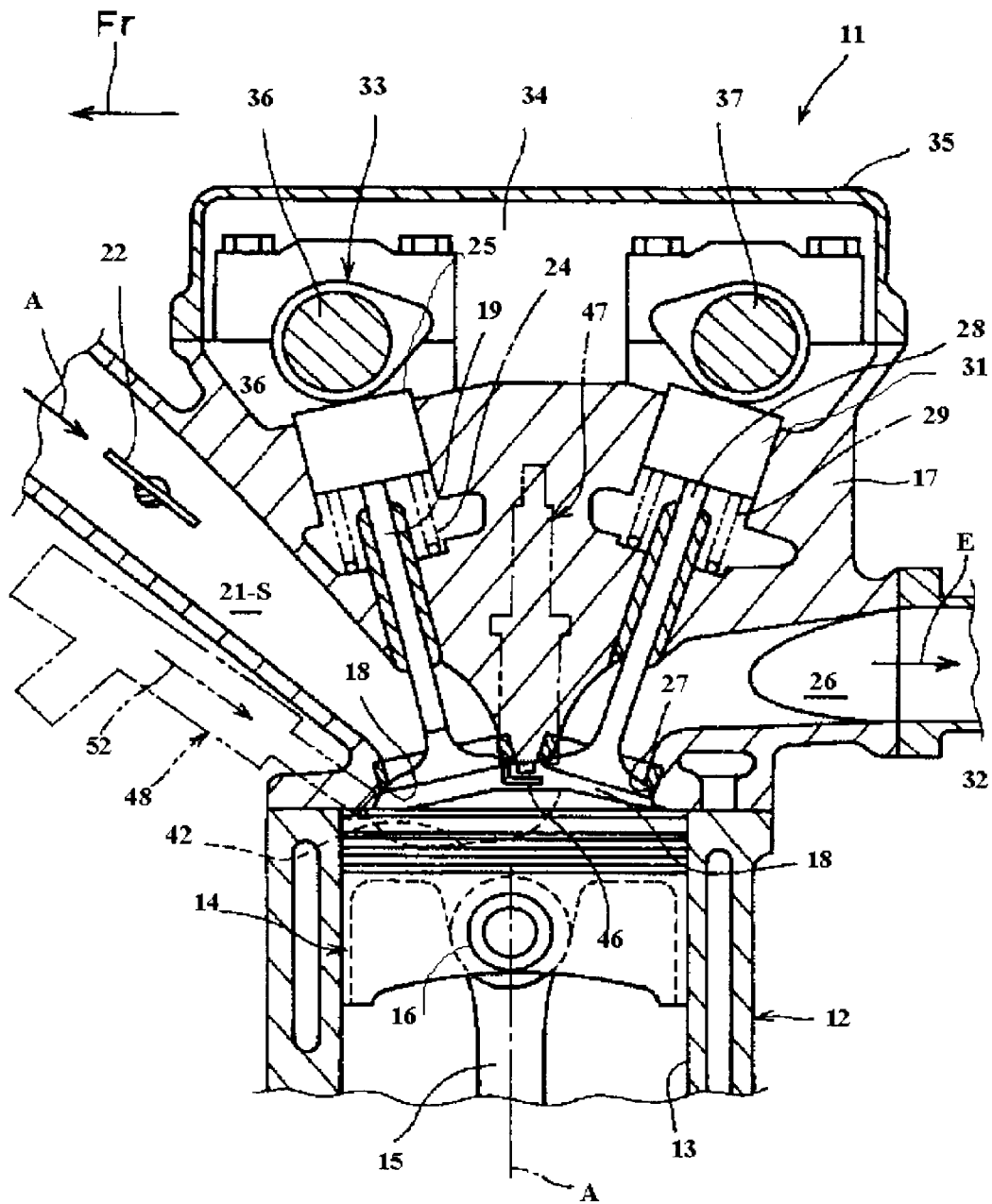
FIG. 2 is a cross sectional view taken though the upper portion of one cylinder of the engine.

Referring primarily to FIG. 2, each of the intake valves 19 is urged toward its closed position by a coil compression spring 24 that operates against a surface of the cylinder head member 17 and a keeper retainer assembly which is associated with a thimble tappet 25 and which is fixed to upper ends of the stems of each of the intake valves 19.

On the side of the cylinder head member 17 opposite the intake passages 21, there are provided exhaust passages, indicated generally by the reference numeral 26. These exhaust passages 26 are of the Siamese type and each branch thereof extends from a respective exhaust valve seat 27 that is disposed on the opposite side of the plane containing the cylinder bore axis A from the intake valve seats 18.

Poppet type exhaust valves 28 control the flow of exhaust gases through these exhaust valve seats 27. These valves 28 are urged toward their closed position by coil compression springs 29 which act against machined surfaces of the cylinder head member 17 and keeper retainer assemblies that are contained within thimble tappets 31 and which are affixed to the upper ends of the stems of the exhaust valves 28 for urging them to their closed position.

The exhaust gases exit the engine through a flow path defined by the valve seats 27 and the intake passages 26 and indicated by the arrows E. These exhaust gases are collected through an exhaust manifold 32 and are discharged to the atmosphere through an associated exhaust system of a suitable type, of which is not illustrated.

The intake valves 19 and exhaust valves 28 are operated by a valve actuating mechanism, indicated generally by the reference numeral 33 which is formed in a valve chamber 34 formed in part by the cylinder head member 17 and by a cover 35 affixed to the cylinder head member 17. This valve actuating mechanism 33 includes an intake camshaft which has lobes that cooperate with the intake thimble tappets 25 for opening them and their associated intake valves 19 against the action of the coil springs 24. In addition, an exhaust camshaft 36 is journalled in the cylinder head assembly in a suitable manner and has cam lobes that cooperate with the exhaust thimble tappets 31 for opening the exhaust valves 28. The intake and exhaust cam shafts 36 and 37 are operated so as to rotate at one half crankshaft speed in a manner well known in the art.

If desired, this valve actuating mechanism may include a variable valve timing mechanism (VVT) of any known type so as to change the valve timing and/or duration.

It has been noted that the combustion chamber of the engine is formed at least in part by the cylinder head recess 18 and the cylinder bore 13. In addition, the chamber is also formed by the head of the piston and this head is formed with a raised domed part having a generally planar upper surface 38 that lies generally along the plane that separates the intake and exhaust ports 18 and 27 and contains the cylinder bore axis A. An inclined downwardly extending portion 39 of this head is formed on the exhaust side and an inclined downwardly extending portion 41 is formed on the intake side. These inclined portions 39 and 41 and the planar upper portion 38 of the head of the piston are surrounded by a squish area.

In addition, a bowl or recess, indicated generally by the reference numeral 42 having a shape which will be defined next, is formed in the piston surfaces 38 and 41. As best seen in FIG. 1, this recess has a generally circular shape when viewed in the direction of the axis A and defined by a peripheral wall 43 which is eccentrically disposed so as to lie primarily on the intake side of the combustion chamber with its innermost peripheral edge being disposed slightly upwardly of the cylinder bore axis A.

Figure 3:
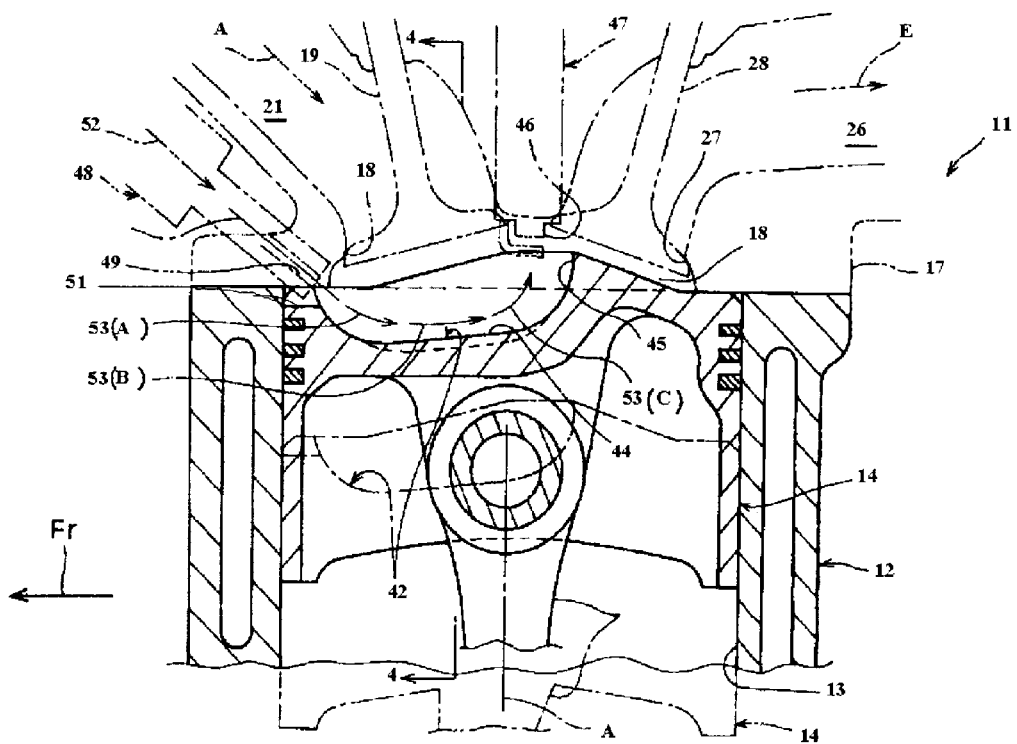
FIG. 3 is an enlarged view looking in the same general direction as FIG. 2 but taken along a different plane.
Figure 4:
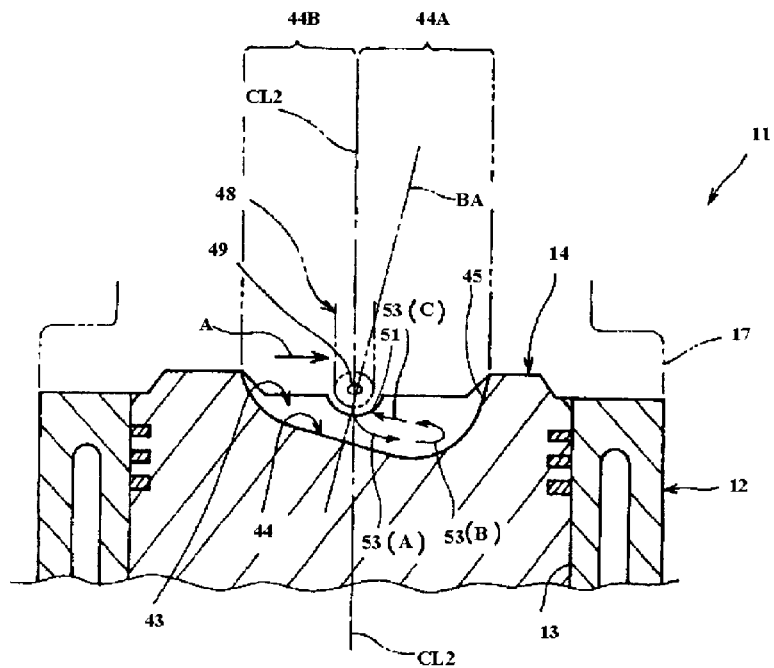
FIG. 4 is a cross sectional view taken along the line 4—4 in FIG. 3.

This recess 42 has a lower wall surface 44 formed at the lower end of the wall 43, as best seen in FIGS. 3 and 4 that slopes generally downwardly on one side of a second plane, indicated by the broken line CL2 that contains the cylinder bore axis. As may be best seen in FIG. 3, the peripheral wall 43 has a relatively shallow curvature on the portion closer to the cylinder bore 13 than at the cylinder bore axis A. In fact, there is a relatively steeply inclined curved wall portion 45 formed on the exhaust side of the cylinder bore 13 and piston head and also toward its central diameter. The lower wall surface 44 is perpendicular to a bowl axis BA (FIG. 4). The curved wall surface 45 is generated about the bowl axis BA.

In fact, this curved wall portion 45 is disposed adjacent the spark gap 46 of a spark plug 47 that is mounted generally on the cylinder bore axis A. This spark gap 46, as best seen in FIGS. 1 and 3 and lies over the inner peripheral edge of the bowl 42.

A fuel injector, shown only in phantom and identified generally by the reference numeral 48 is mounted in the cylinder head member 17 in a position that underlies the intake passages 21-P and 21-S and which has a discharge nozzle opening 49 that lies substantially on the plane CL2 diametrically opposed to the piston bowl 42 from the spark gap 46. Thus, the line CL2 is a diametric line passing between the center of the injector nozzle opening 49 and the spark gap 46 with the injection nozzle opening 49 being positioned on the outer periphery of the bowl or recess 42. As best seen in FIG. 4, the piston head portion 41 is formed with a recessed area 51 leading into the bowl 42 so as to clear the injection nozzle so that the fuel can be sprayed in a generally downward direction toward the bottom surface 44 of the bowl or recess 42.

In accordance with the invention, an arrangement is provided for causing the spray of fuel from the injector nozzle 49 to be directed toward the deeper side 44A of the bowl or recess 42 first and then to swirl around the bowl side surfaces 45 toward the shallower side 44B so as to direct the burning gases outwardly into the remainder of the combustion chamber but to maintain good stratification at the spark gap 46 at the time it is fired.

In this embodiment that result is obtained in two ways. First, the axis of the injector nozzle, indicated by the reference numeral 52, is disposed at an angle e to the centerline CL2 as seen in FIG. 1 so as to spray toward this side of the bowl surface 41, which surface is indicated as 44A. Thus, as seen in this figure, the initial spray from injector, indicated by the arrows 53 with the initial spray portion indicated at 53A extends in a direction transversely across the recess 42. This causes the spray to first flow into the deeper bowl portion 44A.

In addition, the flow control valve 22 is closed under conditions when stratification is desired, normally low and low-mid range performance so that the air flow path A will flow in a circular or swirling direction around the cylinder bore axis A. Thus, the fuel is turned in a direction indicated by the spray pattern 53B to flow around the edge portion 45 of the bowl and be swept upwardly in the direction 53C toward the spark gap 46 where it will present a stoichiometric mixture at the time the plug 47 is fired. Thus, the system can operate on a lean burn or stratified charge principal quite effectively.

Figure 5:
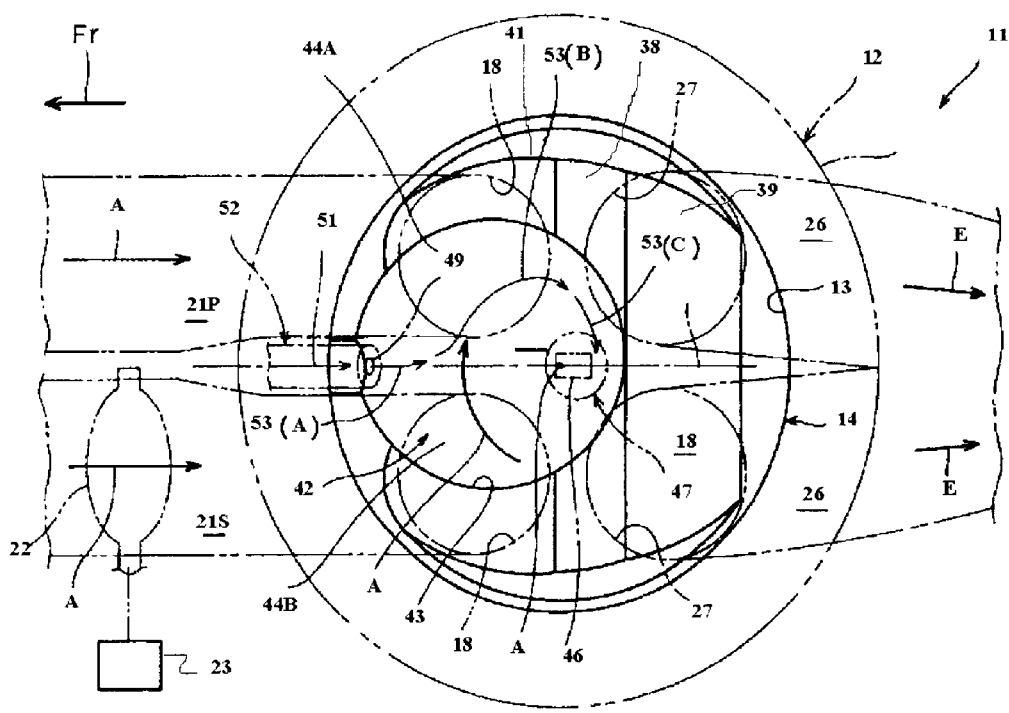
FIG. 5 is a top plan view, in part similar to FIG. 1, and shows another embodiment of the invention.

As noted, the embodiment of FIGS. 1 through 4 achieve the desired flow path in the bowl by canting both the fuel injector 48 and by providing the desired swirling motion through the use of the control valve 22. However, FIG. 5 shows another embodiment wherein this skewed disposition of the fuel injector 48 is not required. In this embodiment, the fuel injector 48 has its spray axis 51 disposed on the line CL2. However, the swirling motion of the intake air charge is still sufficient to provide the desired path of fuel flow as seen in this figure.

Thus, from the foregoing description, it should be readily apparent that the described embodiment provides the ability to obtain a stratified charge through the use of a bowl in the head of the piston, but the bowl configuration is such that it not only promotes the stoichiometric mixture toward the spark gap, but also promotes the flow out of the bowl into the main combustion chamber because of the slanted lower wall and also does not therefore reduce the compression ratio as with the previous type arrangement. Of course, the foregoing description is that of preferred embodiments of the invention and various changes and modifications may be made without departing from the spirit and scope of the invention, as defined by the appended claims.

What is claimed is:

1. An internal combustion engine and combustion chamber therefore comprising a cylinder bore having an axis, a cylinder head closing one end of said cylinder bore and a piston reciprocating in said cylinder bore, a head of said piston having a generally circular recess formed therein when viewed toward the direction of said axis of said cylinder bore, a fuel injector having a nozzle opening for injecting fuel directly into said combustion chamber, an arrangement for causing the fuel flowing from said fuel injector nozzle opening to pass in a circular swirling direction around said as of said cylinder bore and within said piston head recess, a spark plug disposed on a side of said piston head recess diametrically opposite to said fuel injector nozzle opening, said piston head recess having a lower surface thereof inclined to said cylinder bore axis and to a diametric line extending between said fuel injector nozzle opening and said spark plug so as to be deeper on one side of said diametric line than on the other side of said diametric line, said arrangement for effecting the flow or fuel in the circular swirling direction causing the fuel to first flow into the deeper side of said piston head recess.

2. An internal combustion engine and combustion chamber as set forth in claim 1 wherein the arrangement for directing the flow of fuel in the circular swirling direction includes mounting of the fuel injector at an angle to the diametric line so that the fuel first flows to the one side of the recess.

3. An internal combustion engine and combustion chamber as set forth in claim 1 wherein the means for directing the flow of fuel to the one side of the recess from the fuel injector comprises means for introducing a swirling action into an intake charge introduced into the combustion chamber in such a direction.

4. An internal combustion engine and combustion chamber as set forth in claim 3 wherein the means for directing the flow of fuel to the one side of the recess from the fuel injector includes mounting of the fuel injector at an angle to the diametric line so that the fuel first flows to the one side of the recess.

5. An internal combustion engine and combustion chamber as set forth in claim 1 wherein there is provided an intake passage arrangement on one side of the cylinder head for introducing an air charge thereto and an exhaust passage on the other side of the cylinder head for discharging the exhaust products therefrom.

6. An internal combustion engine and combustion chamber as set forth in claim 5 wherein the recess is offset to one side of the piston from the cylinder bore axis.

7. An internal combustion engine and combustion chamber as set forth in claim 6 wherein the piston head recess is offset toward the side of the cylinder head where the intake passage arrangement is.

8. An internal combustion engine and combustion chamber as set forth in claim 7 wherein the intake passage arrangement terminates in a pair of intake ports disposed on opposite sides of the diametric line extending between the point where the fuel injector injects fuel into the combustion chamber and the spark gap.

9. An internal combustion engine and combustion chamber as set forth in claim 8 wherein the arrangement for directing the flow of fuel in the circular swirling direction includes mounting of the fuel injector at an angle to the diametric line so that the fuel first flows to the one side of the recess.

10. An internal combustion engine and combustion chamber as set forth in claim 8 wherein the arrangement for directing the flow of fuel to the one side of the recess from the fuel injector comprises introducing a swirling action into an intake charge introduced into the combustion chamber.

11. An internal combustion engine and combustion chamber as set forth in claim 10 wherein the arrangement for introducing a swirling action to the intake charge comprises an arrangement for controlling the flow direction from the intake ports.

12. An internal combustion engine and combustion chamber as set forth in claim 11 wherein the arrangement controlling the flow direction from the intake ports comprises a flow control valve in one of the intake passages.

13. An internal combustion engine and combustion chamber as set forth in claim 12 wherein the arrangement for directing the flow of fuel in the circular swirling direction also includes mounting of the fuel injector at an angle to the diametric line so that the fuel first flows to the one side of the recess.

\* \* \* \* \*